United States Patent
Seok et al.

(10) Patent No.: US 11,973,229 B2
(45) Date of Patent: Apr. 30, 2024

(54) ANODE FOR LITHIUM METAL BATTERY, MANUFACTURING METHOD OF THE SAME, LITHIUM METAL BATTERY INCLUDING THE SAME

(71) Applicant: KOREA ADVANCED INSTITUTE OF SCIENCE AND TECHNOLOGY, Daejeon (KR)

(72) Inventors: Jae Young Seok, Daejeon (KR); Sanha Kim, Daejeon (KR); Inyeong Yang, Daejeon (KR); Ji-Hun Jeong, Daejeon (KR); Seung Seob Lee, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 9 days.

(21) Appl. No.: 17/355,982

(22) Filed: Jun. 23, 2021

(65) Prior Publication Data

US 2021/0408552 A1    Dec. 30, 2021

(30) Foreign Application Priority Data

Jun. 25, 2020    (KR) .................. 10-2020-0078064

(51) Int. Cl.
  *H01M 4/80*    (2006.01)
  *H01M 4/02*    (2006.01)
  (Continued)

(52) U.S. Cl.
  CPC ............. *H01M 4/80* (2013.01); *H01M 4/045* (2013.01); *H01M 4/134* (2013.01); *H01M 4/382* (2013.01);
  (Continued)

(58) Field of Classification Search
  CPC ........ H01M 4/80; H01M 4/045; H01M 4/134; H01M 4/382; H01M 4/661; H01M 10/052;
  (Continued)

(56) References Cited

U.S. PATENT DOCUMENTS

| 2012/0121983 A1* | 5/2012 | Yoon | H01M 4/0404 |
| --- | --- | --- | --- |
| | | | 429/231.95 |
| 2016/0006016 A1* | 1/2016 | Porthault | C25D 9/08 |
| | | | 205/57 |

FOREIGN PATENT DOCUMENTS

| CN | 106784611 A | * | 5/2017 |
| --- | --- | --- | --- |
| KR | 100582557 | | 5/2006 |
| KR | 1020170064207 A | | 5/2018 |

OTHER PUBLICATIONS

Ma, et al. "Facile and scalable electrodeposition of copper current collectors for high-performance Li-metal batteries." Nano Energy 59 (2019): 500-507. (Year: 2019).*

(Continued)

*Primary Examiner* — Matthew T Martin
*Assistant Examiner* — Bartholomew A Hornsby
(74) *Attorney, Agent, or Firm* — TAROLLI, SUNDHEIM, COVELL & TUMMINO L.L.P.

(57) ABSTRACT

The present disclosure relates to an anode for a lithium-metal battery, a manufacturing method of the same, and a lithium-metal battery including the anode. The anode for a lithium-metal battery includes a complex hierarchical structure current collector which includes an inverted pyramid-shaped micro hole pattern and nanostructures provided within the inverted pyramid-shaped micro hole pattern; and a lithium metal which is electrodeposited on the nanostructure of the current collector. As a result, it is possible to increase the life stability of the battery and increase the coulombic efficiency.

7 Claims, 16 Drawing Sheets

(51) Int. Cl.
    *H01M 4/04*       (2006.01)
    *H01M 4/134*      (2010.01)
    *H01M 4/38*       (2006.01)
    *H01M 4/66*       (2006.01)
    *H01M 10/052*     (2010.01)

(52) U.S. Cl.
    CPC ......... *H01M 4/661* (2013.01); *H01M 10/052* (2013.01); *H01M 2004/021* (2013.01); *H01M 2004/027* (2013.01)

(58) Field of Classification Search
    CPC ..... H01M 2004/021; H01M 2004/027; H01M 4/70; H01M 4/0438; H01M 4/1395; Y02E 60/10
    See application file for complete search history.

(56) References Cited

OTHER PUBLICATIONS

Office Action issued in connection with Korean Patent Application No. 10-2020-0078064 dated Feb. 22, 2022.
Liu, "Recent development in lithium metal anodes of liquid-state rechargeable batteries", Journal of Alloys and Compounds 730 (2018), pp. 135-149.
Xu, "Honeycomb-like porous 3D nickel electrodeposition for stable Li and Na metal anodes", Energy Storage Materials 12 (2018) pp. 69-78.
Zhao, "Hierarchical Cu fibers induced Li uniform nucleation for dendrite-free lithium metal anode", Chemical Engineering Journal 392 (2020), https://doi.org/10.1016/j.cej.2019.123691, pp. 1-8.

* cited by examiner

FIG. 3
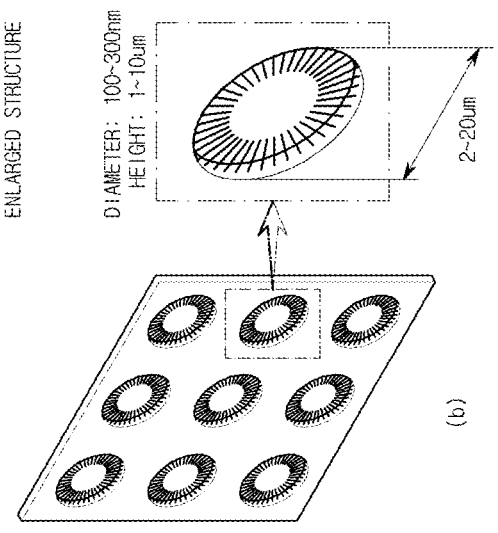
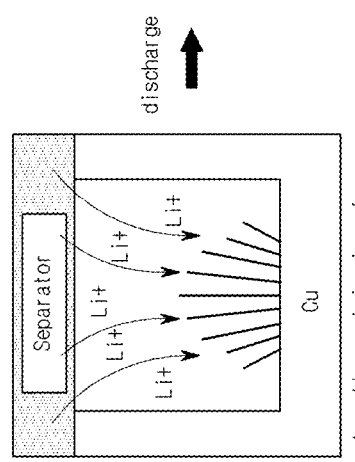
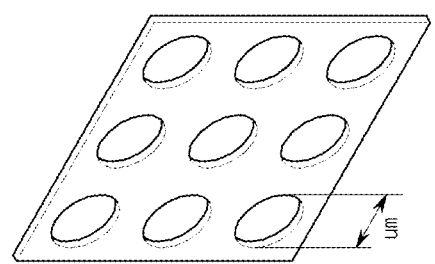
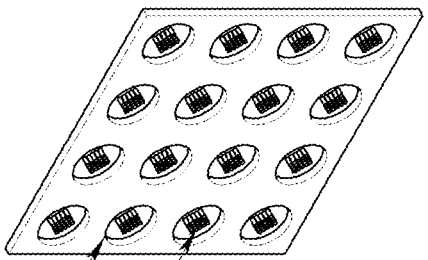

FIG. 6
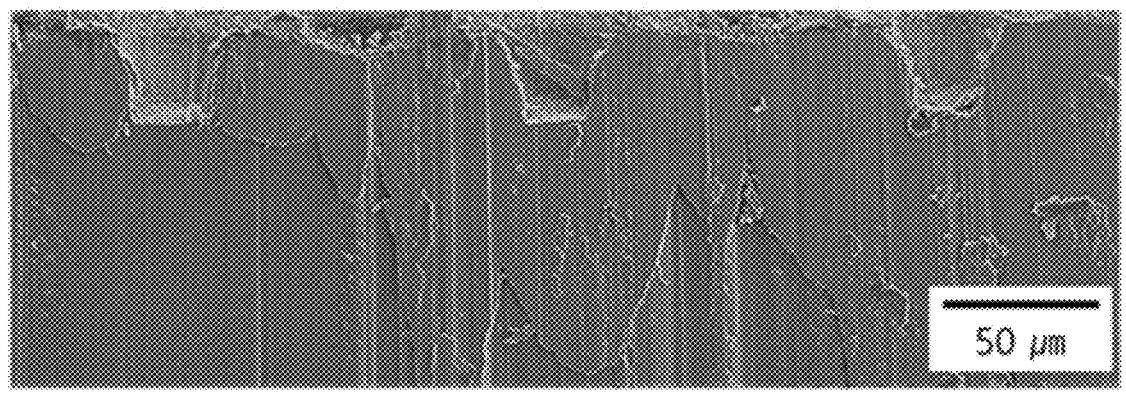
(a)
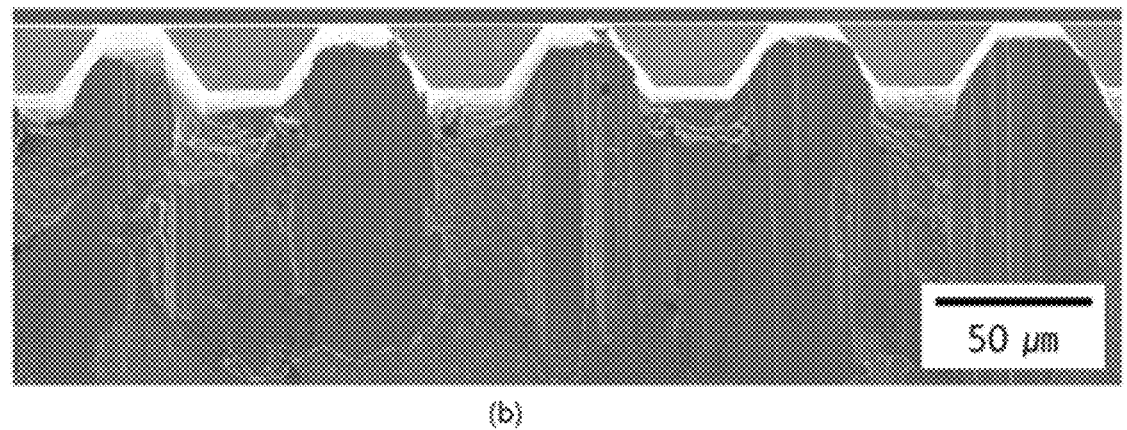
(b)

FIG. 7
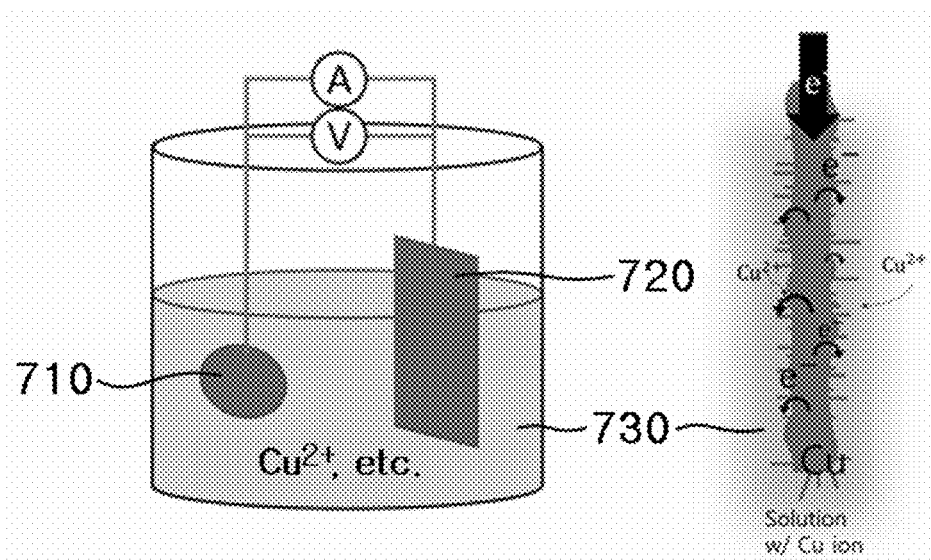
(a)
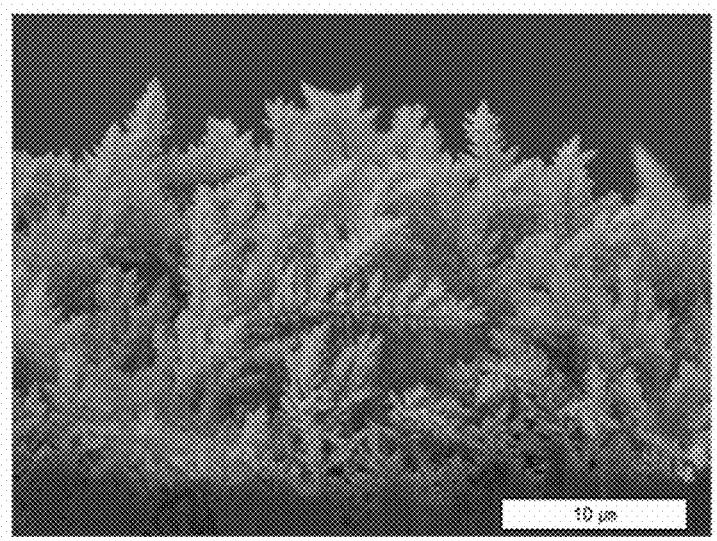
(b)

ANODE FOR LITHIUM METAL BATTERY, MANUFACTURING METHOD OF THE SAME, LITHIUM METAL BATTERY INCLUDING THE SAME

CROSS-REFERENCE TO RELATED APPLICATION

This application claims the benefit under 35 USC 119(a) of Korean Patent Applications No. 10-2020-0078064, filed Jun. 25, 2020, the entire disclosure of which is incorporated herein by reference for all purposes.

BACKGROUND

With the continuous growth of electric vehicle and mobile electronic device industries, the use amount of a battery is increasing exponentially. However, a current lithium-ion battery has a limitation in responding to such a use amount, so that it is essential to research and develop the next-generation lithium secondary battery. As an electric vehicle market continues to grow after many automobile-related companies put the electric vehicle into commercial use, there are a lot of demands for the secondary battery which is considered as a core technology and a lot of demands for technology development related to the secondary battery. The lithium-ion battery is fully being adopted and applied in order to satisfy a high storage capacity required for the electric vehicle. Compared to conventional gasoline vehicles, the electric vehicle takes a longer time to charge, has a travel distance decreased significantly by the operation of an air-conditioner and heating system of the vehicle, and the storage capacity of the battery gradually decreases with repeated charge and discharge. As a result, there is an increasing demand for battery-related technical improvement.

The energy density of the lithium-ion battery is about 250 Wh/kg (based on commercial device/material), which is close to a theoretical limit of cathode and anode materials. Also, it is true that, already due to the state of technical saturation, it is difficult to expect rapid performance development required by the electric vehicle market.

Therefore, more and more attention is paid to the development of the next-generation battery system, and a lithium-metal battery is increasingly important as one of strong candidates for the next-generation battery system.

SUMMARY

Various embodiments relate to an anode for a lithium-metal battery, a manufacturing method of the same, and a lithium-metal battery including the anode.

The theoretical energy storage density of the next-generation batteries is several times as high as that of a current lithium-ion battery. If such technical problems which block the practical use of the next-generation batteries can be solved, it is expected not only to occupy in advance the electric vehicle battery market but also to lead the growth of the market of other portable electronics, and moreover it is expected to change significantly the way of life itself of mankind.

A lithium-metal battery, which will be one of the next-generation batteries, has a very high cathode technology maturity. Therefore, if the anode technology maturity is achieved, it is expected that the lithium-metal battery can be commercialized quickly.

Various embodiments of the present disclosure provide an anode structure of the lithium-metal battery having a hierarchical structure in which a nano-structured electrode is embedded within a micro-structured electrode, and provide a method for manufacturing such an anode.

Also, various embodiments of the present disclosure provide the lithium-metal battery including the anode structure.

The technical problem to be overcome in the present disclosure is not limited to the above-mentioned technical problems. Other technical problems not mentioned can be clearly understood from those described below by a person having ordinary skill in the art.

One embodiment is an electrode for a lithium-metal battery including a complex hierarchical structure current collector which includes an inverted pyramid-shaped micro hole pattern and nanostructures provided within the inverted pyramid-shaped micro hole pattern; and a lithium metal which is electrodeposited on the nanostructure of the current collector.

According to various embodiments, the inverted pyramid-shaped micro hole pattern may be obtained by disposing a plurality of inverted pyramid-shaped micro holes at regular intervals. The inverted pyramid-shaped micro hole may have a quadrangular lower surface and a quadrangular upper surface wider than the lower surface, and has a side surface having an inclined structure.

According to various embodiments, a center-to-center spacing between two adjacent inverted pyramid-shaped micro holes may be 100 μm. A length of one side of the upper surface of the inverted pyramid-shaped micro hole may be between 40 μm to 50 μm, and a depth of the inverted pyramid-shaped micro hole may be 20 μm.

According to various embodiments, the side surface of the inverted pyramid-shaped micro hole may have an inclined structure of between 50 degrees and 60 degrees.

Another embodiment is a method for manufacturing an anode for a lithium-metal battery. The method may include: manufacturing a copper electrode including an inverted pyramid-shaped micro hole pattern; electrodepositing nanostructures on inverted pyramid-shaped micro hole pattern; and electrodepositing a lithium metal on the nanostructures.

According to various embodiments, the manufacturing the copper electrode including the inverted pyramid-shaped micro hole pattern may include: applying an oxygen plasma treated $Si_xN_y$ wafer on a silicon substrate; coating a photo resistor pattern on the $Si_xN_y$ wafer; removing the $Si_xN_y$ wafer in a region where there is no photo resistor pattern, by performing photolithography etching; removing the photo resistor pattern; forming the inverted pyramid-shaped micro hole pattern by etching the silicon substrate of a region where there is no $Si_xN_y$ wafer; depositing a composite of chromium and copper; forming a nickel mold by performing nickel plating through an electrocast; and forming the copper electrode including the inverted pyramid-shaped micro hole pattern by performing copper plating on the nickel mold through the electrocast.

According to various embodiments, the electrodepositing nanostructures on the inverted pyramid-shaped micro hole pattern may include: growing the nanostructures on the copper electrode based on an electrodeposition method; removing the nanostructures overgrown outside the inverted pyramid-shaped micro hole pattern of the copper electrode; and performing mechanical polishing in order to remove the nanostructures remaining outside the inverted pyramid-shaped micro hole pattern of the copper electrode.

According to various embodiments, the removing the nanostructures overgrown outside the inverted pyramid-shaped micro hole pattern of the copper electrode may include removing the nanostructures overgrown outside the inverted pyramid-shaped micro hole pattern of the copper electrode by using a polyimide tape and a rubber roller.

According to various embodiments, the growing the nanostructures on the copper electrode based on an electrodeposition method and the removing the nanostructures overgrown outside the inverted pyramid-shaped micro hole pattern of the copper electrode may be performed repeatedly a plurality of number of times.

According to various embodiments, the manufacturing a copper electrode including an inverted pyramid-shaped micro hole pattern may include manufacturing the inverted pyramid-shaped micro hole pattern such that a plurality of inverted pyramid-shaped micro holes are disposed at regular intervals and the inverted pyramid-shaped micro hole may have a quadrangular lower surface and a quadrangular upper surface wider than the lower surface, and has a side surface having an inclined structure.

According to various embodiments, the manufacturing a copper electrode including an inverted pyramid-shaped micro hole pattern may include: manufacturing such that center-to-center spacing between two adjacent inverted pyramid-shaped micro holes is 100 μm; and manufacturing such that a length of one side of the upper surface of the inverted pyramid-shaped micro hole is between 40 μm to 50 μm, and a depth of the inverted pyramid-shaped micro hole is 20 μm.

According to various embodiments, the manufacturing a copper electrode including an inverted pyramid-shaped micro hole pattern may include manufacturing such that the side surface of the inverted pyramid-shaped micro hole has an inclined structure of between 50 degrees and 60 degrees.

According to various embodiments, the lithium-metal battery may include the above-described anode for the lithium-metal battery.

According to various embodiments, the lithium-metal battery may include the anode for the lithium-metal battery manufactured by the above-described method.

A micro-pattern is made to have high reproducibility, uniformity between patterns, and a degree of freedom of shape-variable control by photolithography and electroforming, and the nano-surface structure is made to have various shapes and diameters by electrodeposition according to the control of halogen ion concentration and an applied voltage. As a result, it is possible to increase the life stability of the battery and increase the coulombic efficiency.

Proposed is a complex hierarchical structure electrode containing nanostructures on an inner surface of the uniform micro-pattern, so that the performance of the lithium-metal battery can be improved and the lithium-metal battery can be commercialized quickly.

Advantageous effects that can be obtained from the present disclosure are not limited to the above-mentioned effects. Further, other unmentioned effects can be clearly understood from the following descriptions by those skilled in the art to which the present disclosure belongs.

BRIEF DESCRIPTION OF THE DRAWINGS

FIG. 3 is a schematic view of a micro/nano-complex hierarchical structure electrode proposed in the present disclosure;

FIG. 6 shows that a cross section (a) of a cylindrical micro hole pattern structure is compared with a cross section (b) of an inverted pyramid-shaped micro hole pattern structure;

FIG. 7 shows a schematic view (a) of manufacturing the nanostructure by using an electrodeposition method and a SEM picture (b) of the manufactured sample;

With regard to the description of the drawings, the same or similar reference numerals may be used for the same or similar components.

DETAILED DESCRIPTION

Figure 1:
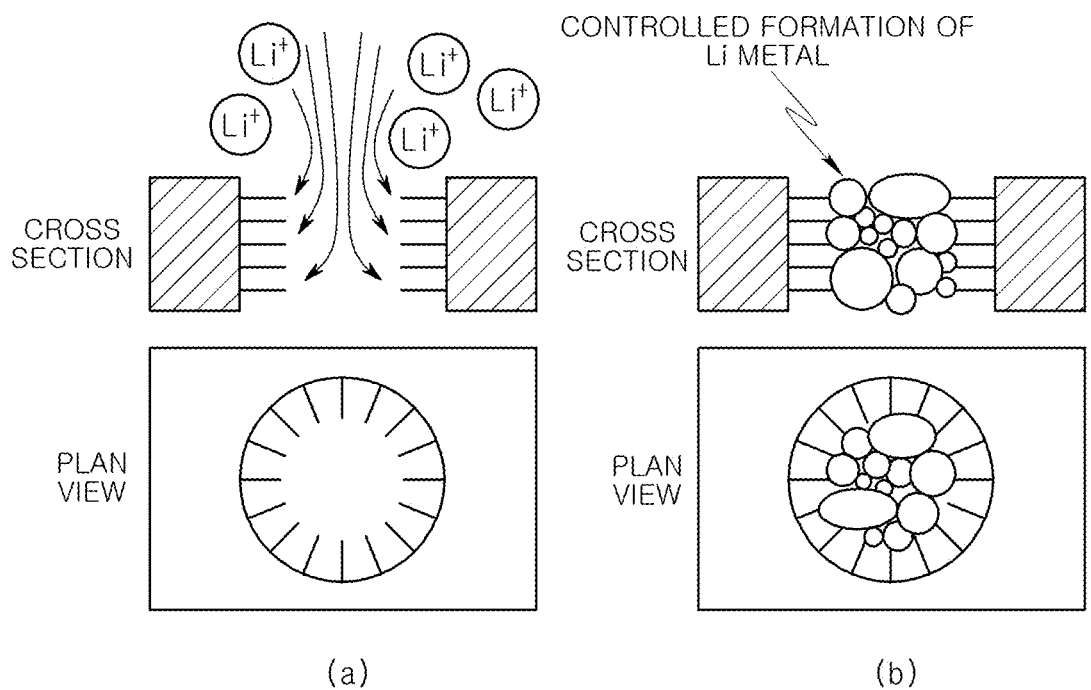
FIG. 1 shows a schematic view (a) of the electric field concentration effect of a complex hierarchical structure in a charge-discharge operation of a lithium-metal electrode and a schematic view (b) of electrodeposition control and confined formation of lithium-metal.

Hereinafter, embodiments of the present disclosure will be described in detail with reference to the accompanying drawings, in which the same or similar components will be given the same reference numerals, and redundant description thereof will be omitted.

Also, in the following description of the embodiment disclosed in the present specification, the detailed description of known technologies incorporated herein is omitted to avoid making the subject matter of the embodiment disclosed in the present specification unclear. Also, the accompanied drawings are provided only for more easily describing the embodiment disclosed in the present specification. The technical spirit disclosed in the present specification is not limited by the accompanying drawings. All modification, equivalents and substitutes included in the spirit and scope of the present invention are understood to be included in the accompanying drawings.

While terms including ordinal numbers such as the first and the second, etc., can be used to describe various components, the components are not limited by the terms mentioned above. The terms are used only for distinguishing between one component and other components.

When it is said that a component is "connected" or "coupled" to another component, the component may be directly connected to or coupled to that other component, but it should be understood that another component may exist between them. On the other hand, when it is said that a component is "directly connected" or "directly coupled" to another component, it should be understood that no other component may exist between them.

Technologies that play a key role in the next generation battery system are commonly a lithium-metal anode technology. Lithium-metal is not only light in itself due to its low density, but also has characteristics such as an extremely high capacity (3860 mAh/g), a low electrochemical potential (−3.04 V vs. SHE), etc., so that the lithium-metal is considered as the most desirable material in a lithium-based battery.

However, the lithium-metal has not been used in practice for several decades due to a problem in the formation of a resin structure in a charge-discharge process.

FIG. 1 shows a schematic view (a) of the electric field concentration effect of a complex hierarchical structure in a charge-discharge operation of a lithium-metal electrode and a schematic view (b) of electrodeposition control and confined formation of lithium-metal.

As shown in FIG. 1, dendrite growth at a lithium-metal anode causes various problems such as a device short-circuit problem, an electrolyte consumption problem due to a lithium-electrolyte side reaction, a lithium-metal stripping problem, a polarization increase problem, and the like, and as a result, these factors have a direct adverse effect on fatal battery fire (safety problem) and life (stability) property depending on charge-discharge.

A dendrite growth phenomenon in the charge-discharge process is the most fundamental problem that blocks the practical use of the lithium-metal anode. If this problem is solved, the lithium-metal anode can be used in practice very soon.

So far, dendrite formation mechanism analysis has been carried out at various angles in a lithium-metal electrodeposition/desorption process, and the basic mechanism by which lithium is electrodeposited is as follows.

(a) Surface nucleation due to electrodeposition of lithium ions (b) Immediate formation of a solid electrolyte interphase (SEI) layer at the interface between the lithium metal and the electrolyte, due to a low electrochemical potential of lithium.

(c) Diffusion of lithium ion and growth of lithium

Here, lithium is deposited and grown locally only in non-uniform cracks of the SEI layer and reaction nuclei, which are partially formed, so that dendrites are formed. It is therefore necessary to remove and suppress partial non-uniformity factors depending on the reaction position on the entire reaction surface in order to suppress the dendrite. Also, since all the above processes are performed at the position of each electrode at the same time, there are a lot of complex considerations, and thus difficulties exist in technology development.

Figure 2:
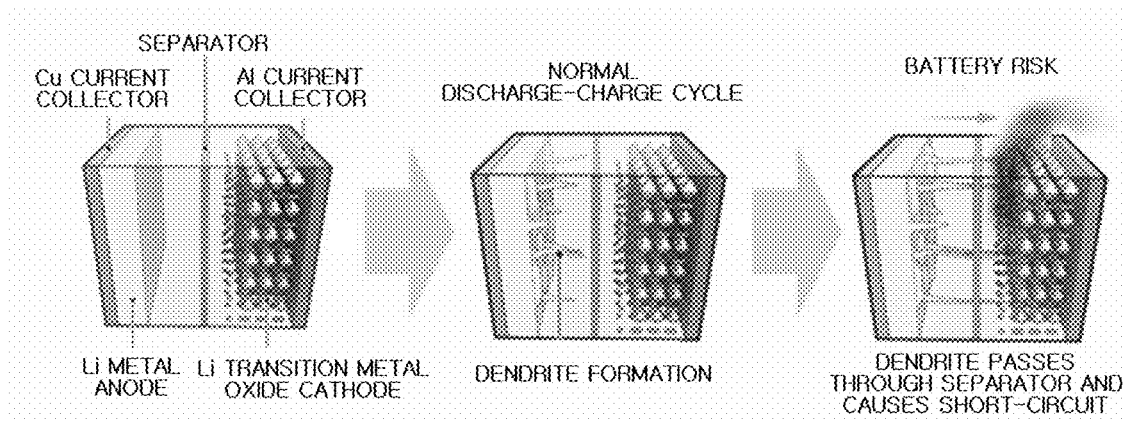
FIG. 2 shows a stability problem due to dendrite formation in the charge-discharge of a lithium-metal anode.

FIG. 2 shows a stability problem due to dendrite formation in the charge-discharge of the lithium-metal anode.

In order to solve the stability problem of lithium-metal anode, many studies have been made in recent years, and in particular, it may be important to acquire in advance a new technology that can effectively inhibit the dendrite formation. Researches on the inhibition of lithium-metal dendrite have been greatly increased in recent three years, and technical approaches of the researches can be broadly divided into three categories as follows.

(a) Study on the composition of the electrolytic and an additive, (b) Study on a separator and electrode-separator interface to induce a uniform flow of lithium-ions in a reaction process and to inhibit the dendrite growth through mechanical pressure, (c) Design and study of an electrode structure for stable electrochemical reaction current distribution and dendrite growth control in the lithium electrodeposition/desorption process.

The study on the composition of the electrolytic and an additive directly affects the formation of the SEI layer and the growth of lithium, and accordingly determines dominantly the grain size and shape in the growth of lithium. Attempts have been made for various compositions and additives of the liquid-based electrolyte. Recently, many electrolyte compositions which have high stability and are usable in the next-generation battery (lithium-sulfur/lithium-air batteries, etc.) have been developed and announced.

On the other hand, dendrite formation caused by electrodeposition/desorption instability of lithium at a high charge rate cannot be solved only by improving the electrolyte, and therefore more and more attention is paid to a method of forming a special form of structure on the electrode or electrode interface to effectively homogenize the flow of lithium-ions and the current density. Accordingly, in recent years, with the development of nanotechnology, electrodes having various sizes and shapes, such as nano-porosity, nanowire, mesh, and pillar shapes, are being actively proposed. However, there has been no quantitative comparison analysis as to how the shape and size of each structure show effect, and there is no consensus of opinion as to which structure is most effective for inhibiting the dendrite growth of lithium-metal.

The present disclosure proposes a micro-pattern based multi-scale complex structure material having new nano-structures, proposes a method of independently controlling important properties of the complex structure and producing the complex structure, and proposes a high-performance lithium secondary battery which is effectively utilized as a lithium-metal anode battery and is stably operated.

Design and Manufacturing Process of Micro-Nano Hierarchical Structure Current Collector The present disclosure proposes that a hierarchical structure in which not only microstructure electrodes but also nanostructure electrodes are embedded together is used in the lithium-metal anode.

FIG. 3 is a schematic view of a micro/nano-complex hierarchical structure electrode proposed in the present disclosure.

A general microstructure electrode is schematically shown in (a) of FIG. 3, and a micro/nano-complex hierarchical structure electrode proposed in the present disclosure is schematically shown in (b) and (c) of FIG. 3. In the complex hierarchical structure of (b) and (c) of FIG. 3, the microstructure and the nanostructure perform different functions independently of each other, and can provide, as shown in (d) of FIG. 3, a significant synergy effect in the lithium-metal electrodeposition/desorption process in the charge-discharge.

The microstructures serve to allow the electrodeposited lithium metal aggregates to be stably formed on the electrode, and the three-dimensional microstructure further reduces the local current density and induces a uniform flow (Flux) of lithium-ions dissolved in the electrolyte, thereby greatly helping stable electrodeposition of lithium. In addition to this, the size of the lithium aggregates which is electrodeposited in a fully charged state is about 500 nm to 5 μm, and a process of forming and optimizing the microstructure having an appropriate shape and size is essential in order to stably accommodate such lithium metal in an intended position.

The nanostructures serve to stably control the charge-discharge by concentrating the electric field when the lithium-metal is electrodeposited toward the microstructures and then by confining the electrodeposited lithium aggregates well within the microstructure. Here, the thinner and longer the nanostructure, the greater the electric field concentration effect. This is the same principle as that of the lightning rod which can be seen in real life. In an electrochemical technique, the electric field concentration formed in a protrusion is amplified in a form that is inversely proportional to the radius r of the protrusion and proportional to the length h of the protrusion. In this respect, the nanostructures inserted within the microstructures perform well the function of the electric field concentration, and consequently can show charge-discharge operating characteristics such as those shown in FIG. 1. Meanwhile, a fine surface nanostructure can ensure close electrical contact by increasing the contact surface with the electrodeposited lithium metal, and consequently can increase the lithium electrodeposition/desorption stability and further enhance the reversibility of the reaction, i.e., the coulombic efficiency.

In addition to this, a nano-micro complex electrode can have a very large surface area, so that it has an excellent effect of lowering the current density at the same charge-discharge rate. Therefore, nano-micro complex electrode can also be utilized in high power/quick charge battery applications. As a result, a good electrode can be realized that can achieve all the major factors of the next generation battery such as a very high capacity of the lithium-metal material itself, stable charge-discharge lithium electrodeposition/desorption control through the structural advantages, and high output through high surface area characteristics.

Manufacturing Process of Nano-Micro Complex Hierarchical Structure Electrode

Microstructure Manufacturing Process

First, two different manufacturing processes may be used to design and manufacture a pattern in which a cylindrical or inverted pyramid-shaped micro hole structure is periodically formed in order to implement the microstructure of a copper electrode surface.

The cylindrical hole pattern structure is designed to have a diameter of 20, 30, 40, or 50 μm, a depth of about 30 μm and a center-to-center spacing of less than 50 μm, and an electroforming process can be used in a photoresist (PR) pattern patterned by photolithography. The final copper pattern can be produced by once again performing the copper electroforming process on an electroformed nickel mold. This is because there is an economic advantage of being able to repeatedly produce the copper pattern through the one manufactured nickel mold.

Figure 4:
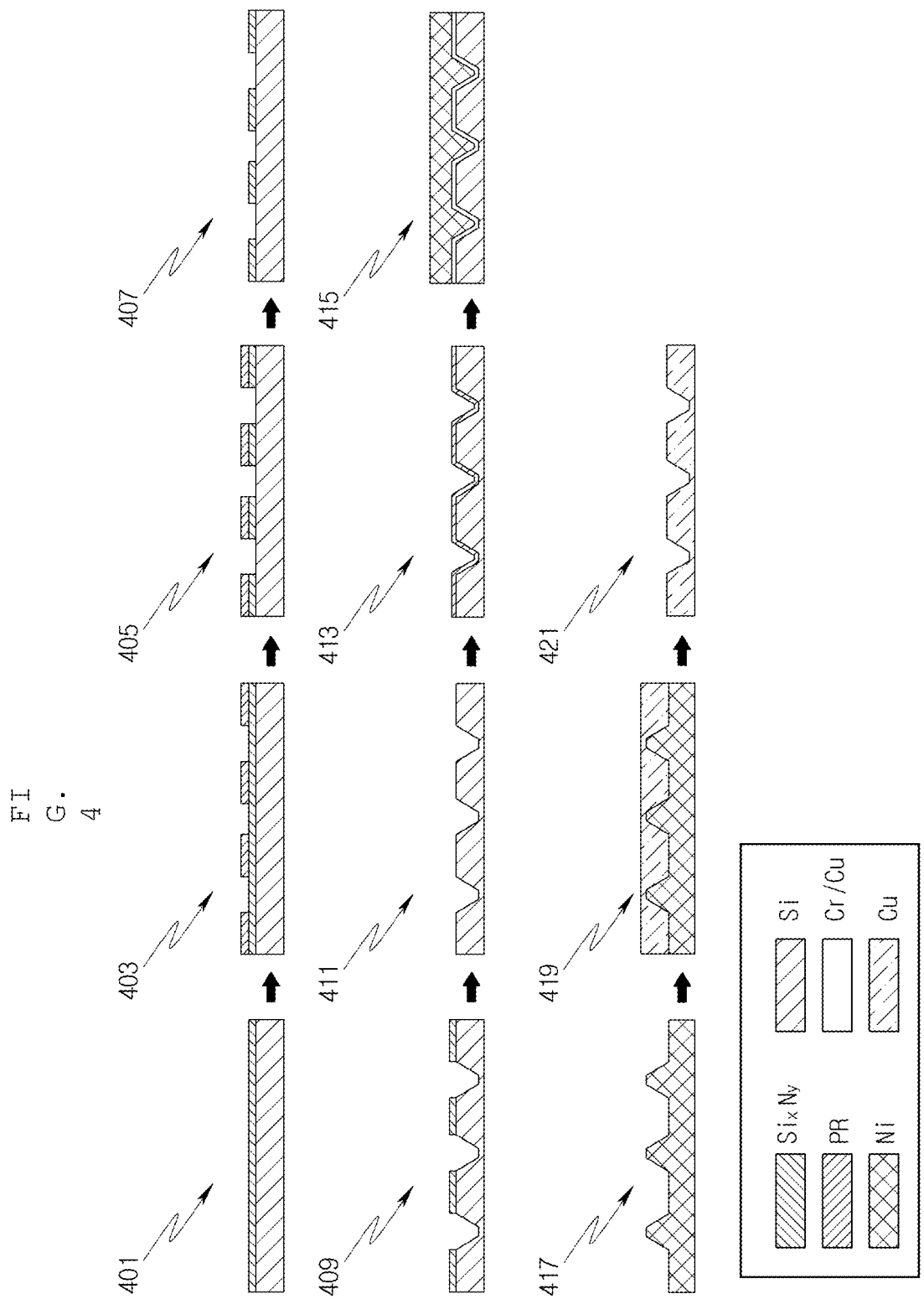
FIG. 4 shows a manufacturing process of an inverted pyramid microstructure electrode.

FIG. 4 shows a manufacturing process of an inverted pyramid microstructure electrode.

Referring to FIG. 4, an oxygen plasma treated $Si_xN_y$ wafer can be applied on a silicon substrate (401). Next, photolithography etching may be performed (405) after the $Si_xN_y$ wafer is coated with the PR pattern (403). Then, the PR pattern is removed (407), and then the $Si_xN_y$ wafer etched according to the PR pattern can be obtained. Next, etching is performed with KOH (409), and then an inverted pyramid-shaped micro hole pattern may be formed in a region where the $Si_xN_y$ wafer of the silicon substrate has been etched. Then, the photolithography etching is performed again (411), and then all remaining $Si_xN_y$ wafers can be removed. Then, a chromium/copper (Cr/Cu) composite may be deposited (413). Nickel (Ni) plating may then be performed (415) through an electrocast to form the nickel mold (417). Copper (Cu) plating is performed again on the nickel mold through the electrocast (419) so that a copper electrode including the inverted pyramid-shaped micro hole pattern can be finally formed (421).

Figure 5:
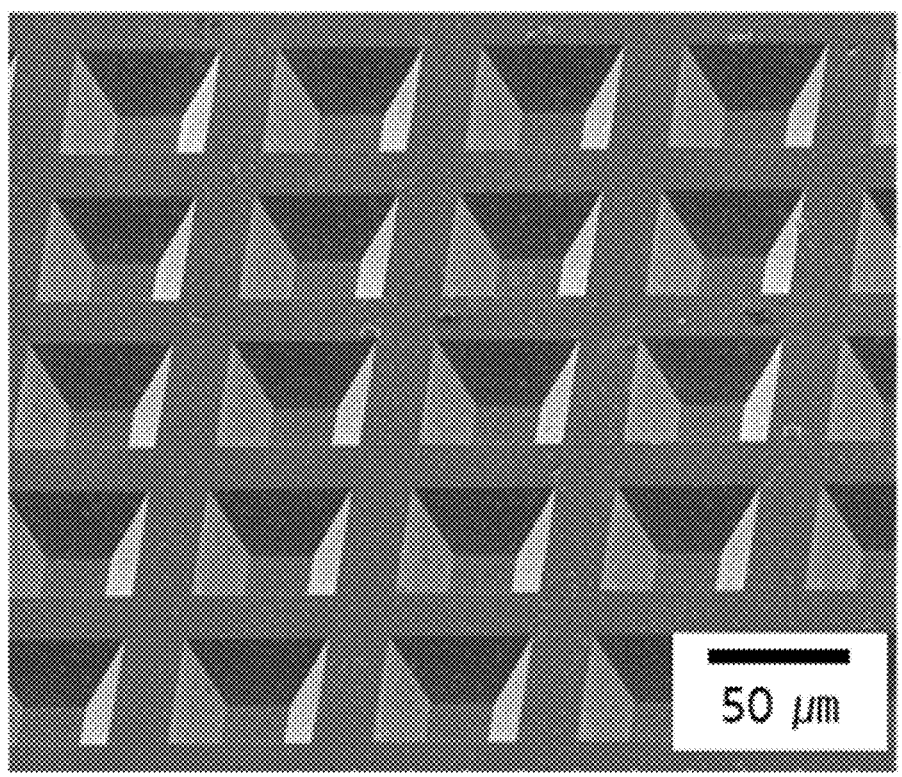
FIG. 5 shows a scanning electron microscope (SEM) image of a sample of the inverted pyramid microstructure electrode manufactured according to the manufacturing process of FIG. 4.

FIG. 5 shows a scanning electron microscope (SEM) image of a sample of the inverted pyramid microstructure electrode manufactured according to the manufacturing process of FIG. 4.

According to the embodiment, the inverted pyramid hole pattern structure such as that shown in FIG. 5 formed through the manufacturing process shown FIG. 4 may have one side of 40 to 50 μm, a depth of about 20 μm, and a center-to-center spacing of about 100 μm, without being limited thereto.

FIG. 6 shows that a cross section (a) of the cylindrical micro hole pattern structure is compared with a cross section (b) of the inverted pyramid-shaped micro hole pattern structure.

The manufacturing method of the cylindrical micro hole pattern structure may have a problem in that the shape thereof is deformed as shown in (a) of FIG. 6 during the release process due to the vertical structure, and thus the precision of the final shape may be greatly reduced. In particular, a cylinder having a size of 20 to 30 μm may be deformed into a conical shape.

The inverted pyramid-shaped micro hole having the inverted pyramid-shaped micro hole pattern structure has a quadrangular lower surface and a quadrangular upper surface wider than the lower surface, and has a side surface having an inclined structure, thereby facilitating the release. According to the embodiment, when the side surface of the inverted pyramid-shaped micro hole has an inclined structure of between 50 and 60 degrees, in particular an inclined structure of 54.7 degrees, it is possible to produce a highly precise inverted pyramid-shaped micro structure as shown in (b) of FIG. 6. Thus, it may be reasonable to employ the manufacturing method of the inverted pyramid-shaped micro hole pattern structure rather than the manufacturing method of the cylindrical micro hole pattern structure.

Nanostructure Manufacturing Process

Two different manufacturing methods may be used to implement the nanostructure.

The galvanic displacement reaction is a nanostructure growth method that utilizes a redox reaction by the reduction potential difference of two dissimilar metals (copper and aluminum) within a metal salt. By controlling the concentration of the metal salt, the amount of a surfactant added, and a reaction time, it is possible to manufacture a nanostructure in which the form of copper that is electrodeposited on the surface of the copper electrode has a high slenderness ratio.

FIG. 7 shows a schematic view (a) of manufacturing the nanostructure by using an electrodeposition method and a SEM picture (b) of the manufactured sample.

Figure 8:
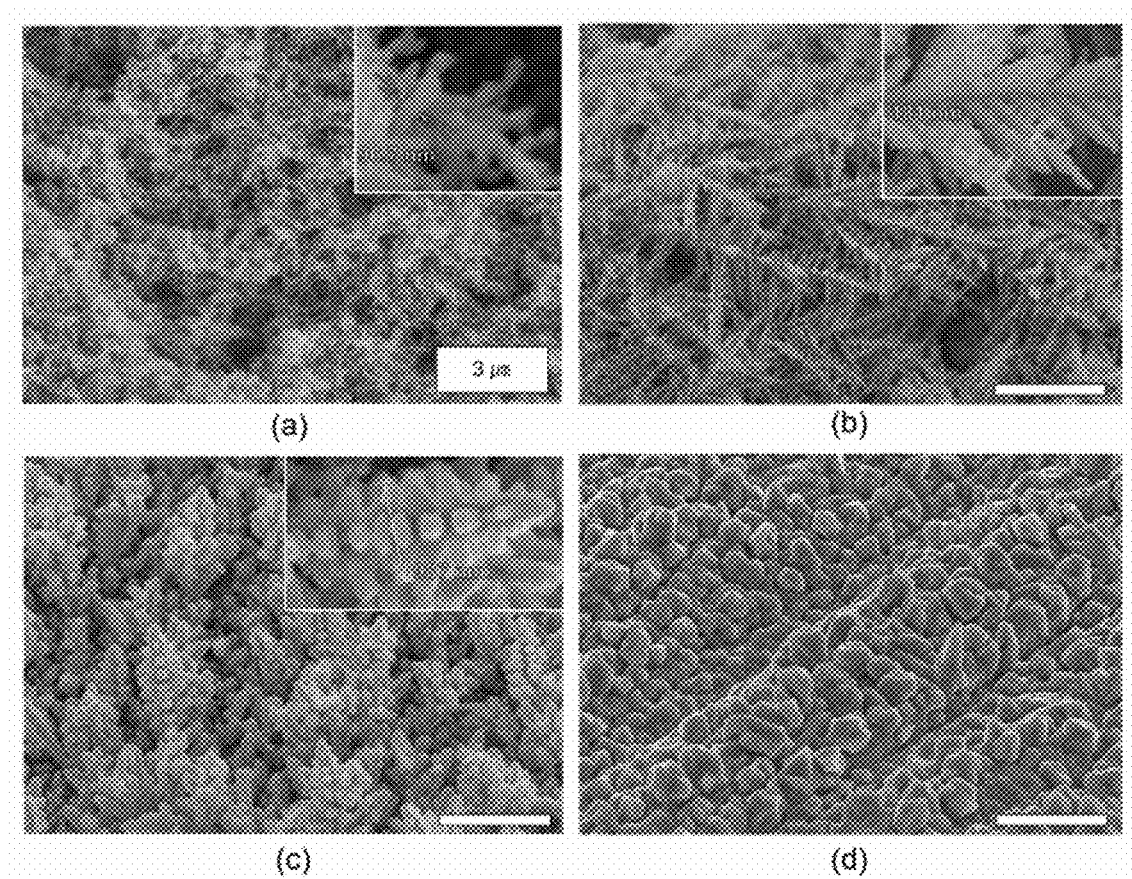
FIG. 8 shows a nano-surface structure manufactured through the electrodeposition under various conditions.

FIG. 8 shows a nano surface structure manufactured through the electrodeposition under various conditions.

As shown in FIG. 7, the electrodeposition method is to deposit copper on the surface by placing two copper electrodes 710 and 720 in an electrolytic 730 in which copper ions are present and by applying a direct current voltage. Here, nanostructure copper with a high slenderness ratio can be also deposited on the electrode surface by controlling the magnitude of the direct current voltage and the reaction time.

The galvanic replacement method has a disadvantage that the reaction time taken to sufficiently grow the nanostructure is as much as 5 to 24 hours and it is difficult to uniformly form the nanostructure on the entire surface due to the concentration of the current at the end of the electrode. Unlike this, the electrodeposition method has a very short reaction time and is able to minimize the difference in growth rate caused by the concentration of the current due to the short reaction time, and thus, uniform nanostructure growth is possible on a large surface area of the electrode.

Also, the electrodeposition method has an advantage of being able to finely manipulate the shape of the growing nanostructure as shown in FIG. 8 by controlling the type and amount of the additive and the magnitude and time of the applied voltage.

Micro/Nano-Complex Hierarchical Structure Manufacturing Process

Figure 9:
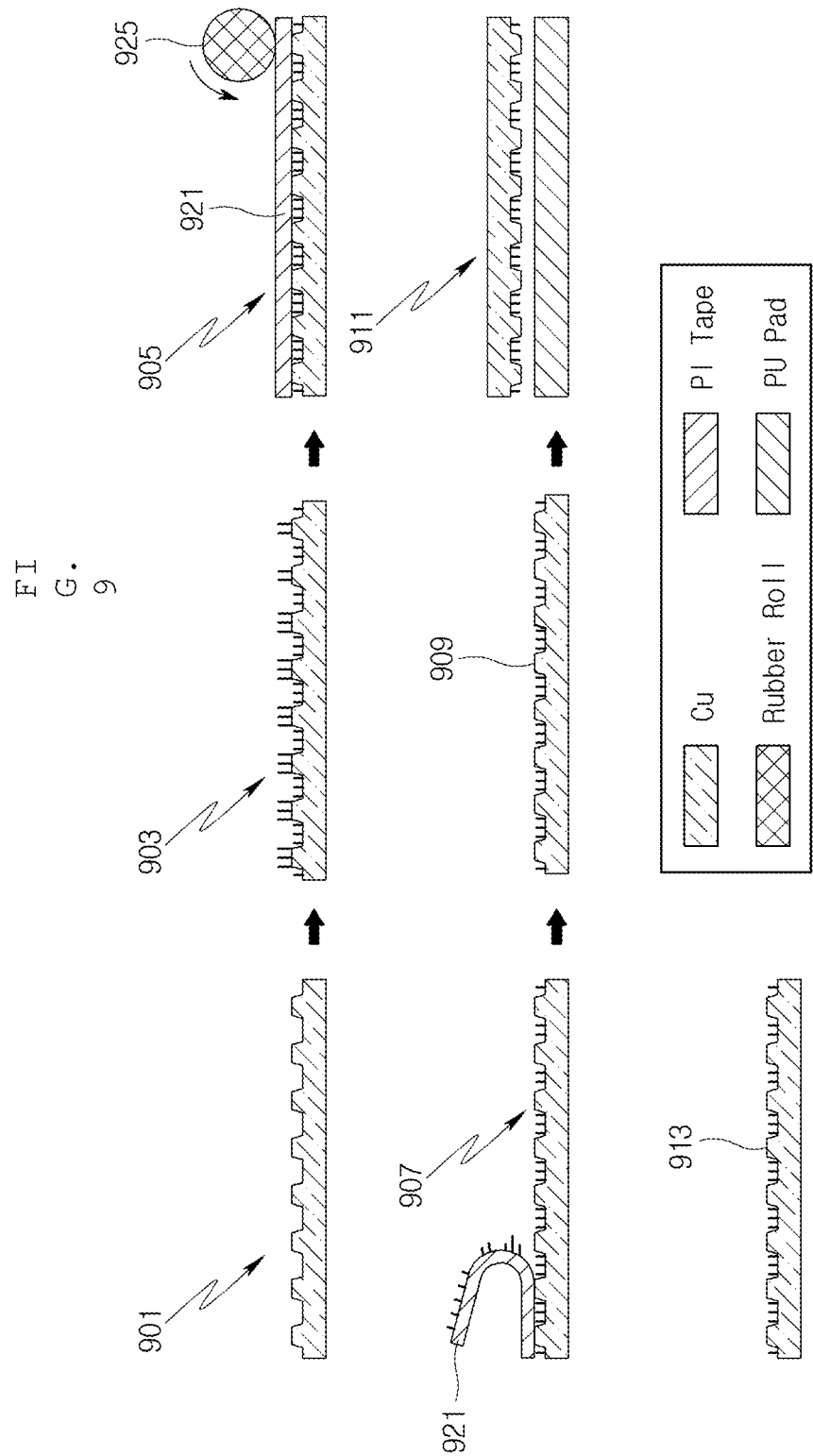
FIG. 9 is a manufacturing process diagram of the micro/nano-complex hierarchical structure electrode.

FIG. 9 is a manufacturing process diagram of the micro/nano-complex hierarchical structure electrode.

Although it is possible to manufacture a complex hierarchical structure by single electrodeposition, there is a problem that the nanostructure growth is prominent outside the structure rather than inside because a current is concentrated on the outside of a relatively protruding microstructure.

In order to solve this problem, a process for manufacturing the micro/nano-complex hierarchical structure electrode shown in FIG. 9 is proposed.

Referring to FIG. 9, in step 901, a copper (Cu) electrode including the inverted pyramid-shaped micro hole pattern may be formed according to the process of FIG. 4. Then, in step 903, nanostructures can be electrodeposited on the micro hole pattern according to the method shown in FIG. 7. In steps 905 and 907, nanostructures that have been unnecessarily overgrown outside the microstructures by the concentration of the current can be removed by a polyimide tape 921 and a rubber roller 925. Additionally, steps 903, 905, and 907 can be performed repeatedly a plurality of number of times in order to accommodate more nanostructures within the microstructure. Then, only a few nanostructures remain outside the microstructure (909), and mechanical polishing is performed in step 911 in order to remove the remaining nanostructures, and finally the micro/nano-complex hierarchical structure electrode can be manufactured (913).

Figure 10:
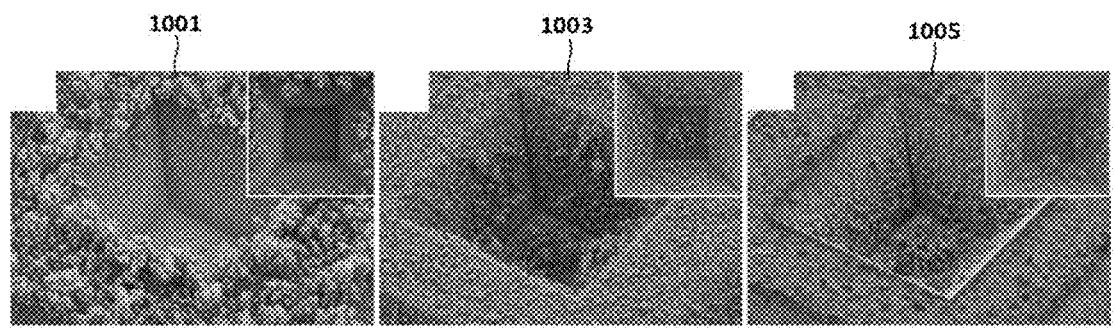
FIG. 10 shows a SEM image of the micro/nano-complex hierarchical structure electrode during the manufacturing process.

FIG. 10 shows a SEM image of the micro/nano-complex hierarchical structure electrode during the manufacturing process.

Referring to FIG. 10, a figure indicated by a reference numeral 1001 shows the SEM image after electrodepositing the nanostructures on the microstructures in step 903. A figure indicated by a reference numeral 1003 shows the SEM image after removing the nanostructures outside the microstructures according to steps 903, 905, and 907. A figure indicated by a reference numeral 1005 shows the SEM image of a finally manufactured micro/nano-complex hierarchical structure electrode after performing the mechanical polishing in step 911.

Figure 11:
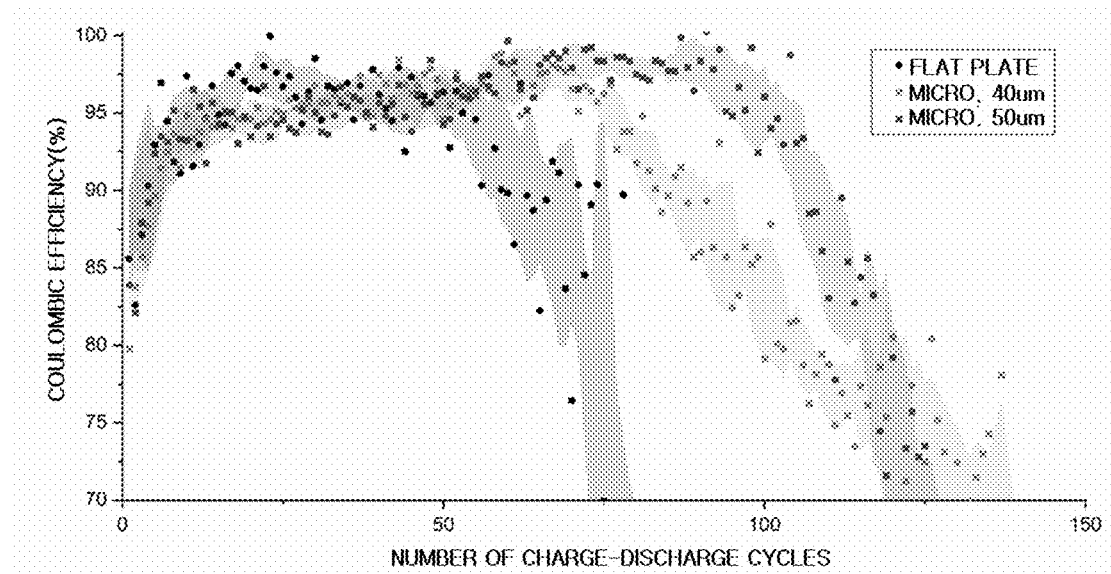
FIG. 11 shows the change in life and coulombic efficiency of a lithium-metal battery depending on the presence or absence of the microstructure.

Life and Coulombic Efficiency Analysis and Evaluation Depending on the Presence or Absence of Microstructures FIG. 11 shows the change in life and coulombic efficiency of a lithium-metal battery depending on the presence or absence of the microstructure.

Referring to FIG. 11, as a result of the analysis of battery performance between a bare flat plate electrode manufactured in the same way as the electroforming method and an electrode having the inverted pyramid microstructure of 40 or 50 μm in size, it can be found that the electrode having the microstructure has an excellent coulombic efficiency.

The coulombic efficiency may be a ratio between the total amount of charge involved in the charging process and the total amount of charge involved in the discharging process and may be a numerical value of the reversibility of the reaction in the charge-discharge process. As shown in FIG. 11, while the coulombic efficiency of the bare flat plate electrode rapidly decreases after about 50 charge-discharge cycles, the microstructure electrode can maintain a high coulombic efficiency for up to about 100 charge-discharge cycles. This result may mean that an electrode with a microstructure shows a better stability than that of the bare flat plate electrode.

Table 1 shows the coulombic efficiency for each charge-discharge cycle interval. Referring to Table 1, it can be seen that a 50 μm microstructure electrode has an average coulombic efficiency that is about 2% higher than that of a 40 μm microstructure electrode during 100 cycles.

TABLE 1

|  |  | Bare Flat Plate | Micro | |
| --- | --- | --- | --- | --- |
|  |  |  | 40 μm | 50 μm |
| Number of cycles | CE > 90% | 59 | 83 | 106 |
| Average coulombic efficiency, % | ~40th cycle | 95.0 | 93.7 | 93.7 |
|  | ~100th cycle | 76.4 | 93.6 | 95.8 |

Figure 12:
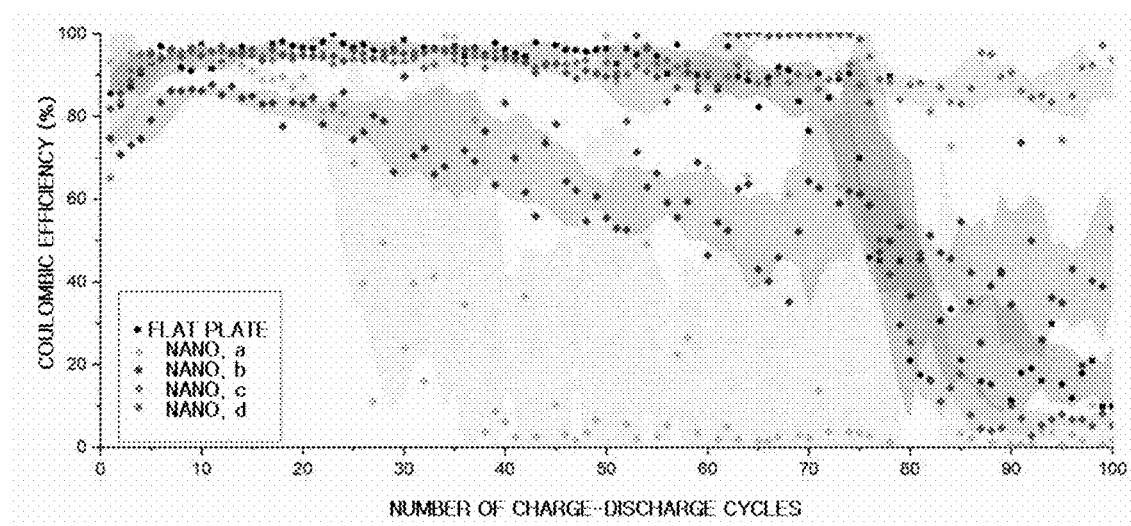
FIG. 12 shows the life and coulombic efficiency characteristics, according to the presence or absence of the nanostructure.

Life and Coulombic Efficiency Analysis and Evaluation Depending on the Presence or Absence of Nanostructures FIG. 12 shows the life and coulombic efficiency characteristics, according to the presence or absence of the nanostructure.

In FIG. 12, the terms Nano (a), Nano (b), Nano (c), and Nano (d) refer to the nano surface structures shown in (a), (b), (c), and (d) of FIG. 8, respectively.

Referring to FIG. 12, it can be seen that the nanostructure electrode grown by the electrodeposition method generally has a lower performance than that of a common bare flat plate copper electrode.

Table 2 shows the coulombic efficiency for each charge-discharge cycle interval. Referring to Table 2, it can be seen that the bare flat plate electrode has the most excellent average coulombic efficiency during 40 and 80 cycles. In particular, it can be seen that the nanostructure (b) manufactured by using bromine ions does not show a coulombic efficiency of 90% or more even once.

TABLE 2

|  |  | Bare Flat Plate | Nano | | | |
|---|---|---|---|---|---|---|
|  |  |  | a | b | c | d |
| Number of cycles | CE > 90% | 59 | 15 | — | 56 | 47 |
| Average coulombic efficiency, % | ~40th cycle | 95.0 | 72.3 | 79.4 | 93.3 | 94.4 |
|  | ~80th cycle | 90.5 | 48.8 | 68.6 | 91.9 | 91.4 |

Figure 13:
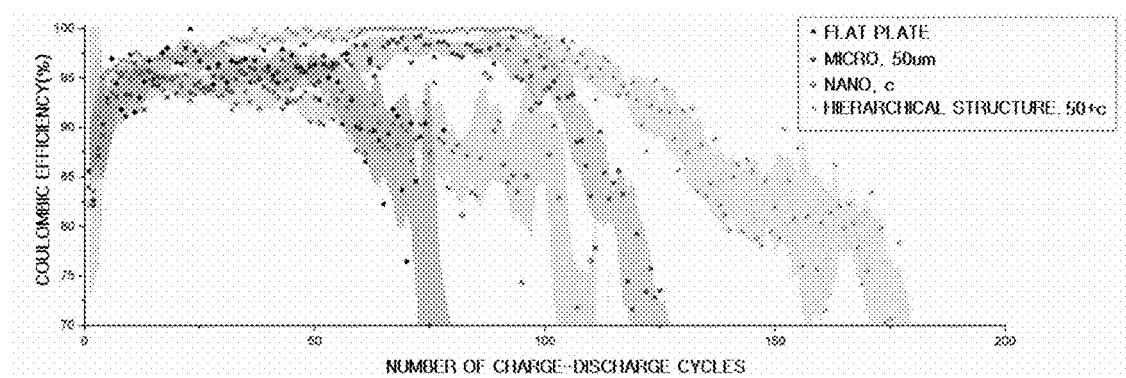
FIG. 13 shows that the life and coulombic efficiency characteristics of the micro/nano-complex hierarchical electrode are compared with those of a bare flat plate structure, the microstructure, and the nanostructure.

Life and Coulombic Efficiency Analysis and Evaluation of Micro/Nano-Complex Hierarchical Electrode FIG. 13 shows that the life and coulombic efficiency characteristics of the micro/nano-complex hierarchical electrode are compared with those of a bare flat plate structure, the microstructure, and the nanostructure.

Referring to FIG. 13, it can be seen that the micro/nano-complex hierarchical electrode has little change in the coulombic efficiency for each cycle and maintains a very high coulombic efficiency during cycle repetition for a long period of time.

Table 3 shows that the life and coulombic efficiency characteristics according to the bare flat plate structure, the microstructure electrode, the nanostructure electrode, and the complex hierarchical structure are compared. Referring to Table 3, it can be seen that the average coulombic efficiency of the micro/nano-complex hierarchical electrode is at least 20% higher than that of the bare flat plate electrode during 100 cycles.

TABLE 3

|  |  | Bare Flat Plate | Micro 50 um | Nano c | Complex hierarchical 50 um + b |
|---|---|---|---|---|---|
| Number of cycles | CE > 90% | 59 | 106 | 56 | 122 |
| Average coulombic efficiency, % | ~40th cycle | 95.0 | 93.7 | 93.3 | 96.6 |
|  | ~80th cycle | 90.5 | 95.8 | 82.94 | 98.4 |

Electrochemical Characteristic Analysis

Analysis of Overpotential Characteristics in Lithium Electrodeposition Process

Figure 14:
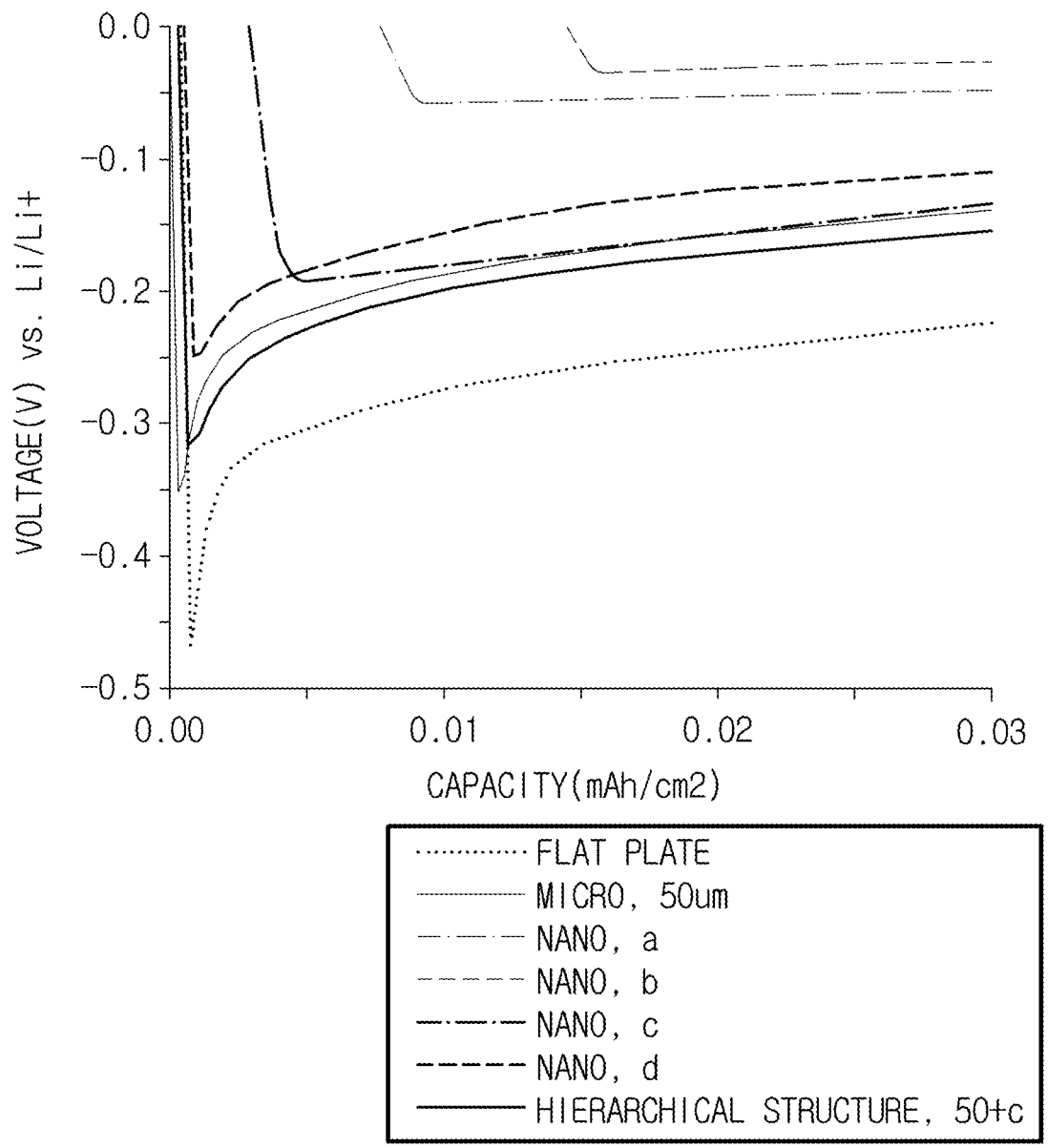
FIG. 14 shows changes in overpotential generated when lithium is electrodeposited on the bare flat plate structure electrode, the microstructure electrode, the nanostructure electrode, and the micro/nano-complex hierarchical structure electrode.

FIG. 14 shows changes in overpotential generated when lithium is electrodeposited on the bare flat plate structure electrode, the microstructure electrode, the nanostructure electrode, and the micro/nano-complex hierarchical structure electrode.

It is possible to determine the kinetic hindrance to which lithium ions are subjected from the overpotential in the electrodeposition and desorption process of the lithium, and the less the overpotential, the more ideal battery can be realized.

Referring to FIG. 14, the highest overpotential has occurred in the bare flat plate structure without any pattern. It can be seen that, due to the increase in the surface area by the pattern, the overpotential of the microstructure is lower than that of the bare flat plate structure.

It can be seen that the overpotential of the nanostructure is reduced by at least twice as high as the overpotential of the bare flat plate electrode. In life and coulombic efficiency tests for each nanostructure, a palm tree leaf-like nanostructure using halogen ions shows the lowest performance. In contrast to the result, it can be seen that the overpotential shows the lowest properties.

It can be seen that the micro/nano-complex hierarchical structure electrode shows overpotential properties similar to those of the microstructure electrode. This may result from the fact that the nanostructure is not grown on the entire area of the structure and is selectively positioned within the structure.

Electrochemical Impedance Spectroscopy (EIS)

EIS is one of in-situ characteristic analysis methods of the battery. EIS is capable of understanding the resistance characteristics of the electrolyte, the resistance characteristics of the interface, etc., from the Nyquist plot of the impedance and the equivalent circuit. The resistance of the interface is equal to the diameter of the first semicircle of the Nyquist plot.

Figure 15:
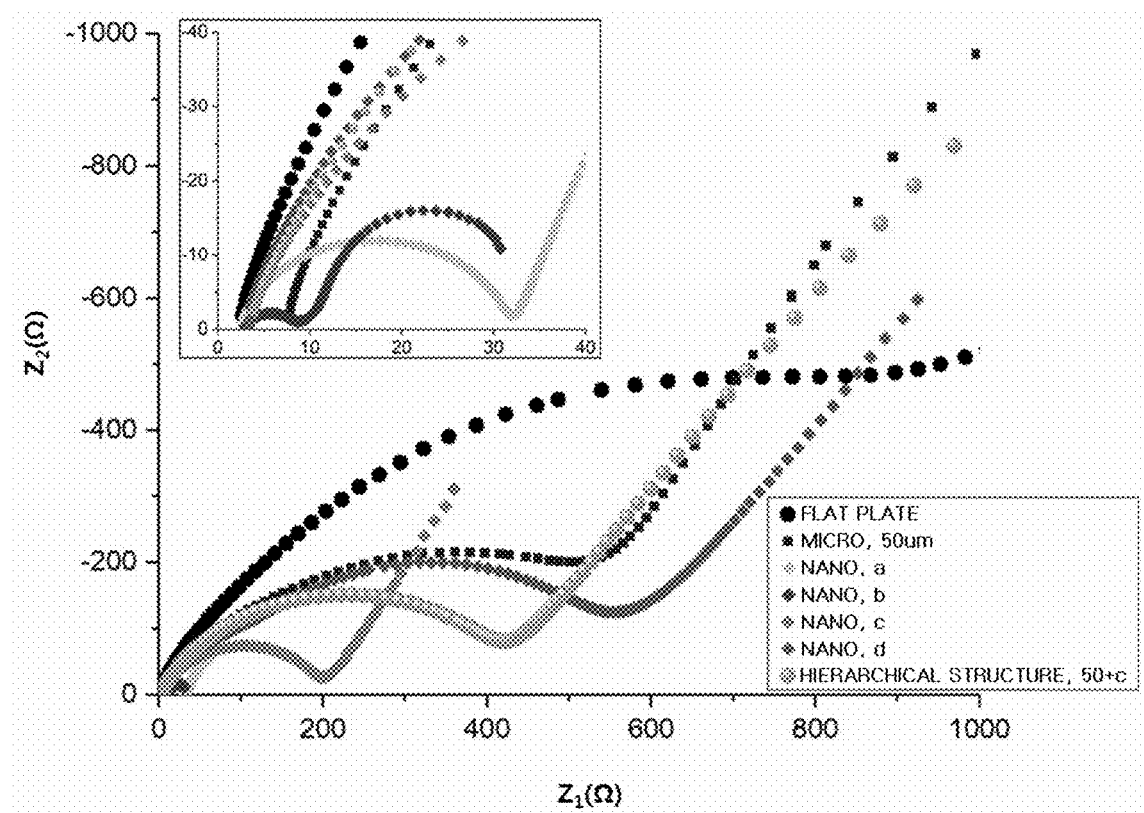
FIG. 15 shows EIS results of the bare flat plate structure, the microstructure, the nanostructure, and the micro/nano-complex hierarchical structure.

FIG. 15 shows EIS results of the bare flat plate structure, the microstructure, the nanostructure, and the micro/nano-complex hierarchical structure.

Referring to FIG. 15, it can be seen that while the bare flat plate structure electrode shows an interfacial resistance characteristic of about 900 ohms, while a 50 µm patterned microstructure electrode shows an interfacial resistance characteristic of 450 ohms, the nanostructure electrode shows interfacial resistance characteristics of 200 ohms and 6 ohms, and the micro/nano-complex hierarchical structure electrode shows an interfacial resistance characteristic of 410 ohms.

Ex-Situ Analysis in Lithium Charge-Discharge Process

Figure 16:
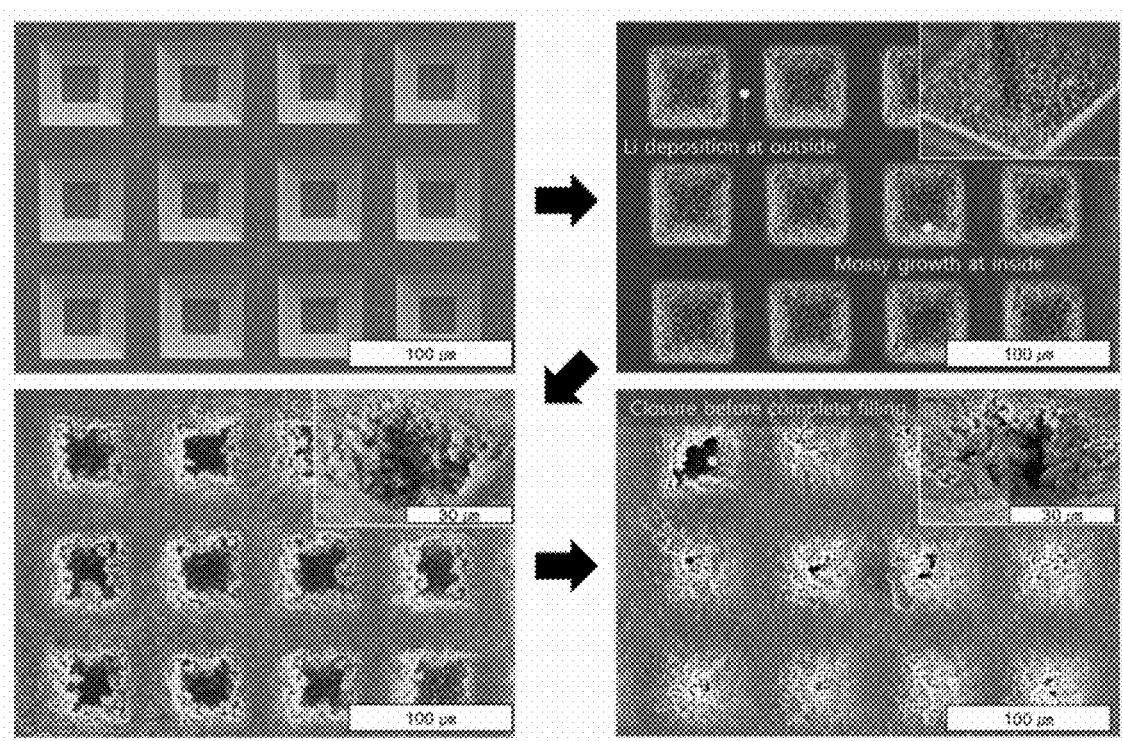
FIG. 16 shows an SEM image of the microstructure according to the amount of lithium electrodeposited in an initial cycle.

FIG. 16 shows an SEM image of the microstructure according to the amount of lithium electrodeposited in an initial cycle.

Referring to FIG. 16, lithium electrodeposition is performed on the outer surface of the microstructure from the beginning of electrodeposition, and the lithium which is electrodeposited within the microstructure shows a moss-like shape. As the electrodeposition proceeds, lithium grows more prominently on the outer surface of the microstructure rather than grows in the form of an aggregate within the microstructure. As a result, the structure may be closed without being completely filled therewithin.

Figure 17:
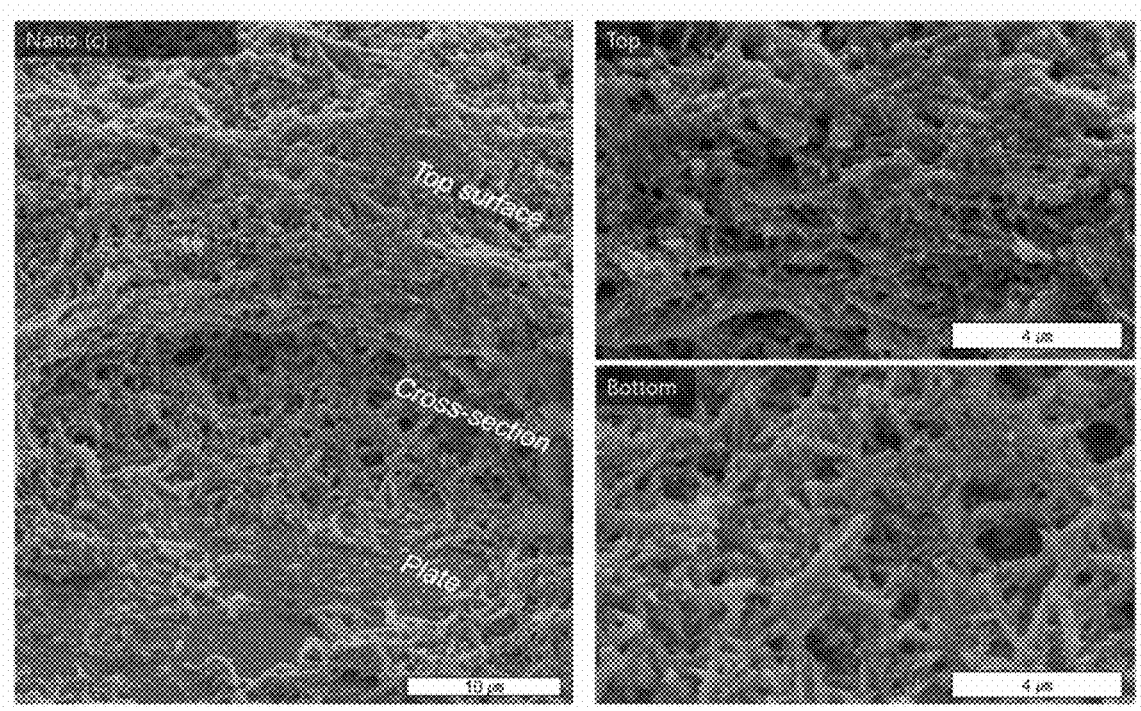
FIG. 17 shows a tilted SEM image of the nanostructure on which lithium has been electrodeposited.

FIG. 17 shows a tilted SEM image of the nanostructure on which lithium has been electrodeposited.

Referring to FIG. 17, considering the electrodeposition pattern of lithium, it can be confirmed that the surface of the nanostructure is well covered with lithium. However, it is confirmed that the upper surface of the electrode is covered with the lithium without completely filling the empty space between the nanostructures. This is thought to result in excessive SEI layer formation, bringing about the depletion of lithium ions within the electrolyte.

Figure 18:
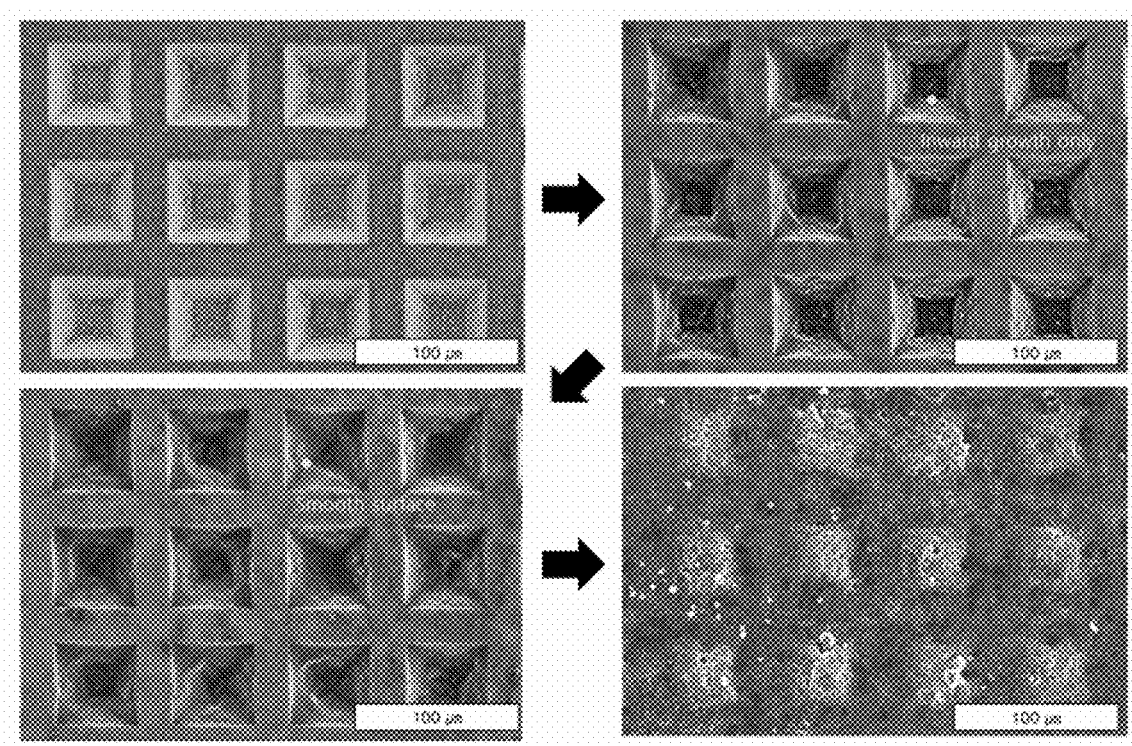
FIG. 18 shows an SEM image of the micro/nano-complex hierarchical structure according to the amount of lithium electrodeposited in the initial cycle.

FIG. 18 shows an SEM image of the micro/nano-complex hierarchical structure according to the amount of lithium electrodeposited in the initial cycle.

Referring to FIG. 18, it can be confirmed that the lithium electrodeposition is performed only on the inner surface of the micro/nano-complex hierarchical structure from the beginning of electrodeposition. This is judged to be a result from the local concentration of the current induced by the nanostructure present within the microstructure. It can also be seen that an appropriate amount of nanostructures increases the surface area to effectively lower the current density so that lithium can be induced to be electrodeposited while forming a very smooth surface. Also, it can be seen that the lithium also grows on the outer surface of the microstructure after all the microstructures are filled.

Figure 19:
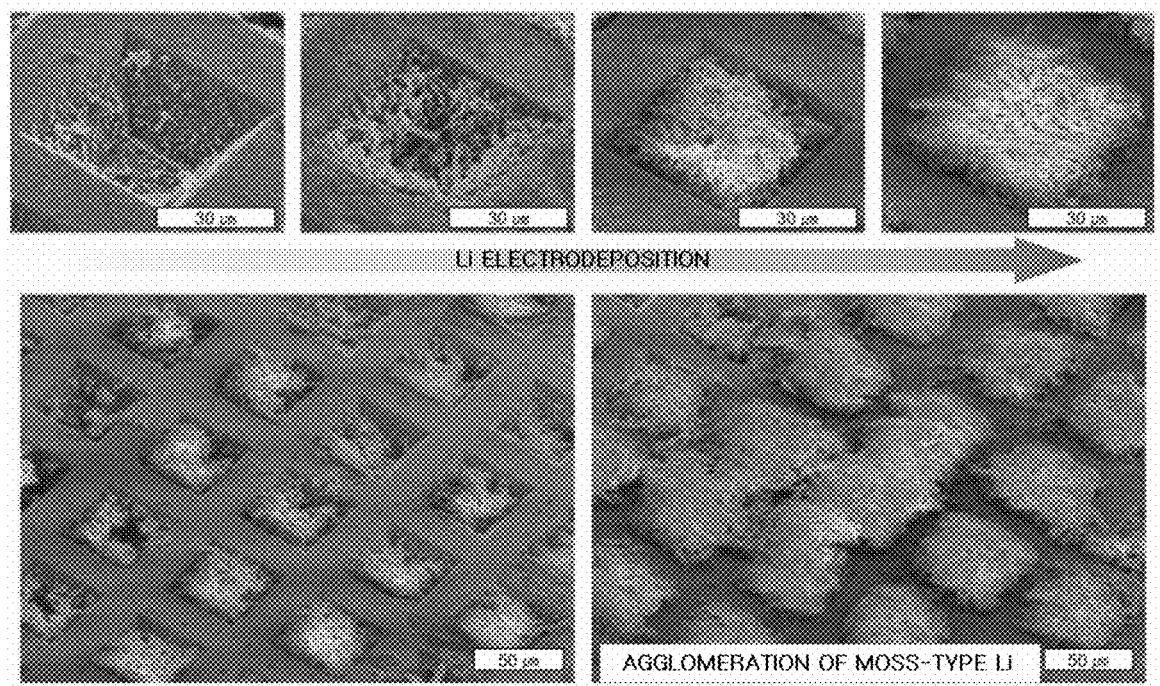
FIG. 19 shows a lithium electrodeposition pattern in the 35-th cycle of the micro/nano-complex hierarchical structure electrode.

FIG. 19 shows a lithium electrodeposition pattern in the 35-th cycle of the micro/nano-complex hierarchical structure electrode.

Referring to FIG. 19, it is not shown that lithium grows while forming a smooth surface, however, it can be confirmed that lithium which has grown in the form of moss aggregate together within the microstructure. It is expected that this enhances the electrical connectivity between lithium and lithium and lithium and the micro/nano-complex hierarchical structure current collector, thereby inhibiting the occurrence of dead lithium in the cell and contributing to the stable maintenance of a high coulombic efficiency.

The micro/nano-complex hierarchical structure electrode described above may be provided as the anode of the lithium-metal battery. Accordingly, the lithium-metal battery may be configured to include the above-described anode, the electrolyte, and the cathode of the micro/nano-complex hierarchical structure. Such a lithium-metal battery has the advantages of the micro/nano-complex hierarchical structure electrode as they are, and thus, can provide improved life characteristics and coulombic efficiency.

The electrolyte of the lithium-metal battery may be a liquid electrolyte or a solid electrolyte. When the electrolyte is a liquid electrolyte, it may include a non-aqueous organic solvent and a lithium salt.

What is claimed is:

1. A method for manufacturing an anode for a lithium-metal battery, the method comprising:
   manufacturing a copper electrode comprising an inverted pyramid-shaped micro hole pattern, wherein the manufacturing the copper electrode comprising the inverted pyramid-shaped micro hole pattern comprises:
   applying an oxygen plasma treated $Si_xN_y$ wafer on a silicon substrate,
   coating a photo resistor pattern on the $Si_xN_y$ wafer,
   removing the $Si_xN_y$ wafer in a region where there is no photo resistor pattern, by performing photolithography etching,
   removing the photo resistor pattern,
   forming the inverted pyramid-shaped micro hole pattern by etching the silicon substrate of a region where there is no $Si_xN_y$ wafer,
   depositing a composite of chromium and copper,
   forming a nickel mold by performing nickel plating through an electrocast, and
   forming the copper electrode comprising the inverted pyramid-shaped micro hole pattern by performing copper plating on the nickel mold through the electrocast;
   electrodepositing nanostructures on the inverted pyramid-shaped micro hole pattern; and
   electrodepositing a lithium metal on the nanostructures.

2. The method of claim 1, wherein the electrodepositing nanostructures on the inverted pyramid-shaped micro hole pattern comprises:
   growing the nanostructures on the copper electrode based on an electrodeposition method;
   removing the nanostructures overgrown outside the inverted pyramid-shaped micro hole pattern of the copper electrode; and
   performing mechanical polishing in order to remove the nanostructures remaining outside the inverted pyramid-shaped micro hole pattern of the copper electrode.

3. The method of claim 2, wherein the removing the nanostructures overgrown outside the inverted pyramid-shaped micro hole pattern of the copper electrode comprises removing the nanostructures overgrown outside the inverted pyramid-shaped micro hole pattern of the copper electrode by using a polyimide tape and a rubber roller.

4. The method of claim 2, wherein the growing the nanostructures on the copper electrode based on an electrodeposition method and the removing the nanostructures overgrown outside the inverted pyramid-shaped micro hole pattern of the copper electrode are performed repeatedly a plurality of number of times.

5. The method of claim 1, wherein the manufacturing a copper electrode comprising an inverted pyramid-shaped micro hole pattern comprises manufacturing the inverted pyramid-shaped micro hole pattern such that a plurality of inverted pyramid-shaped micro holes are disposed at regular intervals,
   and wherein the inverted pyramid-shaped micro hole has a quadrangular lower surface and a quadrangular upper surface wider than the lower surface, and has a side surface having an inclined structure.

6. The method of claim 5,
   wherein the manufacturing a copper electrode comprising an inverted pyramid-shaped micro hole pattern comprises:
   manufacturing such that center-to-center spacing between two adjacent inverted pyramid-shaped micro holes is 100 μm; and
   manufacturing such that a length of one side of the upper surface of the inverted pyramid-shaped micro hole is between 40 μm to 50 μm, and a depth of the inverted pyramid-shaped micro hole is 20 μm.

7. The method of claim 6,
   wherein the manufacturing a copper electrode comprising an inverted pyramid-shaped micro hole pattern comprises manufacturing such that the side surface of the inverted pyramid-shaped micro hole has an inclined structure of between 50 degrees and 60 degrees.

* * * * *